United States Patent Office 3,782,914
Patented Jan. 1, 1974

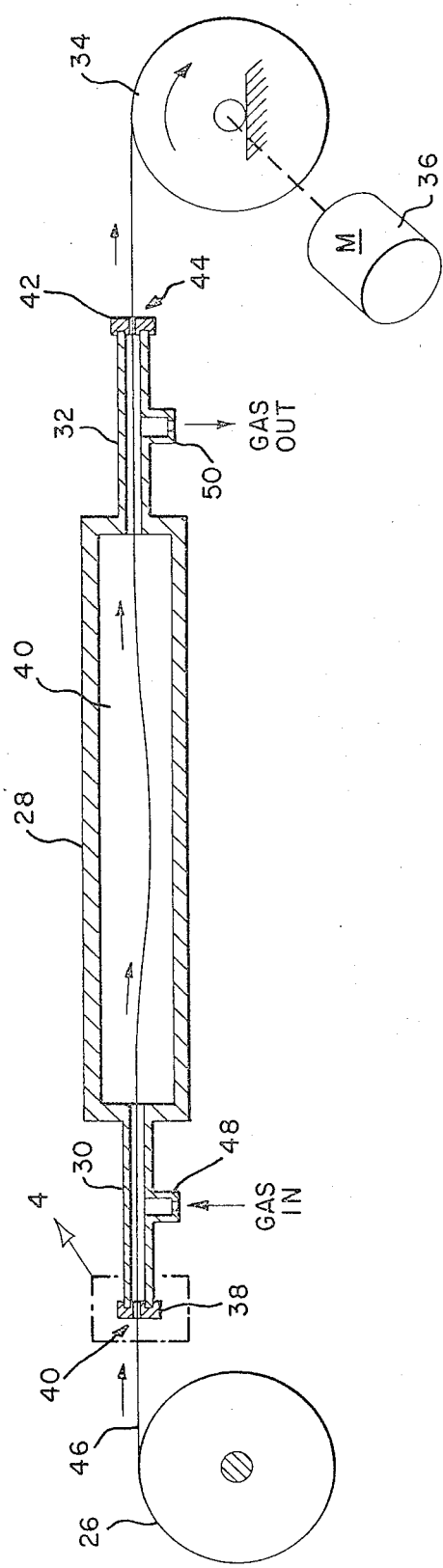

3,782,914
HEAT TREATING OPTICAL WAVEGUIDES FOR OH ION REMOVAL
Robert David De Luca, Big Flats, Donald Bruce Keck, Corning, and Robert Distler Maurer, Painted Post, N.Y., assignors to Corning Glass Works, Corning, N.Y.
Filed Mar. 30, 1972, Ser. No. 239,747
Int. Cl. C03c 15/00, 25/02
U.S. Cl. 65—3
9 Claims

ABSTRACT OF THE DISCLOSURE

Optical waveguides include a core of doped $SiO_2$ and a cladding of pure $SiO_2$ or doped $SiO_2$. The dopant, which is an oxide of a multivalent element, becomes chemically reduced during fabrication which usually includes heating the waveguide so that it can be drawn. For example, titanium dioxide, a commonly used dopant, has $Ti^{+4}$ ions which are reduced to $Ti^{+3}$ ions during the fabrication of the waveguides. These reduced ions increase the attenuation of the waveguide. For example, reduced titanium dioxide is brown. It absorbs light in the blue region and the amount of $Ti^{+3}$ ions in the glass must be quite low in order to get the desired waveguide transmission properties. The reduced multivalent element ion attenuation is minimized by heat treating the waveguide fiber at temperatures in the range of approximately 800 to 1,000° C. for times of approximately six hours or less. The reduced multivalent ion is oxidized with hydroxyl ions deliberately retained in the glass and which serve as the oxidizing agent.

BACKGROUND OF THE INVENTION

This invention relates to the fabrication of optical waveguide fibers and more particularly to a method of heat treating them to reduce attenuation.

The increased burden on communication systems has fostered the development of high capacity systems using optical waveguides. These optical waveguides are constructed of a transparent dielectric material such as glass. They consist of a central core surrounded by a cladding having an index of refraction less than the index of refraction of the core. Light propagates along the waveguide. The theory of optical waveguides is contained in U.S. Pat. 3,157,726—Hicks et al. and in a publication "Cylindrical Dielectric Waveguide Mode," by E. Snitzer, Journal of the Optical Society of America, vol. 51, No. 5, pp. 491–498, May 1961.

Until rather recently, the known optical waveguides had such a high attenuation per unit length that widespread commerical use was not feasible. Recently however, optical waveguides having very low attenuation per unit length have been developed. For example, the Maurer and Schultz, U.S. Pat. 3,659,915, "Glass Optical Waveguide," describes an optical waveguide comprising a cladding layer of pure fused silica or doped fused silica and a core formed of doped fused silica. The copending application of Keck and Maurer, Ser. No. 36,110, describes a method of fabricating multi mode waveguides. The single mode waveguides fabricated in accordance with the application of Keck and Schultz, Ser. No. 36,267, filed May 11, 1970, now U.S. Pat. 3,711,262, are also suitable for use.

While waveguides of the type described above do have very low attenuation per unit length, nevertheless it has been found that even a small improvement in the attenuation per unit length is quite significant because of the long length of optical fibers which are used in present and proposed optical communication systems.

SUMMARY OF THE INVENTION

In accordance with an important aspect of this invention, attenuation caused by reduced multivalent ions can be minimized by heat treating the waveguide fiber at a temperature below the melting temperature of the fiber.

In acordance with another aspect of our invention, heat treating the waveguide at a temperature in the range of approximately 700° C. to 1,200° C. for less than six hours oxidizes the reduced dopant oxide with the hydroxyl ions serving as an oxidizing agent.

The foregoing and other objects, features and advantages of the invention will be better understood from the following more detailed description and appended claims.

DESCRIPTION OF THE DRAWINGS

FIG. 5 depicts the heat treating of the waveguides.

DETAILED DESCRIPTION OF THE INVENTION

Figure 1:
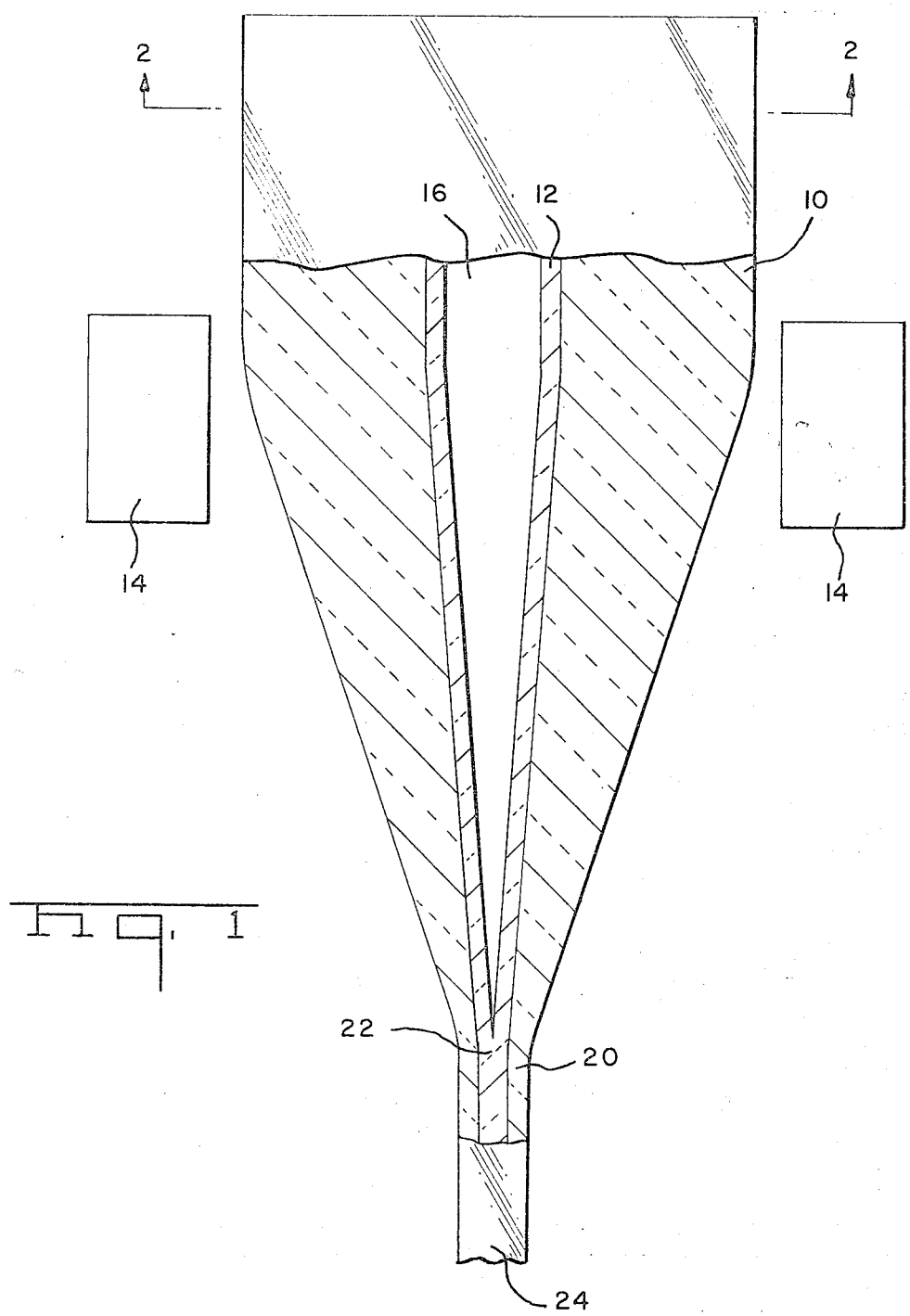
FIG. 1 depicts the process of heating and drawing the waveguide during the fabrication of the waveguide.

FIG. 1 depicts the process of forming the waveguide fiber as is more fully described in the aforementioned Keck-Schultz application. A thick wall tube 10 of cladding glass has a thin film 12 of core glass on the inside wall. The wall tube of cladding glass and the thin film of core glass are heated by the surrounding furnace 14 until tube 10 and core glass 12 reach a temperature at which the materials have a sufficiently low viscosity for drawing. The composite structure is then drawn until the longitudinal hole 16 collapses. That is, the core glass fills the hole 16 to form a solid core 22 surrounded by cladding 20. The cross-sectional area is reduced until the fiber 24 has a solid cross-sectional area with a doped $SiO_2$ core and a cladding of pure $SiO_2$, or doped $SiO_2$, with an index of refraction which is less than the index of refraction of the core.

As more fully described in the aforementioned Keck-Schultz application, the waveguide sometimes is made of pure fused silica doped with titanium dioxide. In making multi mode waveguides, as in the Maurer-Keck application, a film of $SiO_2$, or doped $SiO_2$, is deposited on a solid rod. The data which is subsequently given applies to these multi mode waveguides.

At the high melting temperatures which is obtained in the furnace, reduced ions are formed as follows:

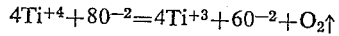

The reduced titania, $Ti^{+3}$, colors the glass. (As used in this specification reduced means the chemical reaction in which a negative charge is added to an ion.) Of course, titanium dioxide is only one example of a dopant that can be used. The oxides of many multivalent elements are suitable for use. If such an oxide is designated $RO_2$, then the reaction during the formation of the waveguide is:

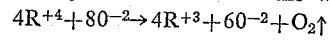

In accordance with this invention, heat treating the waveguides after they have been formed decreases attenuation caused by the above factors.

Commonly, the waveguides have a diameter of less than .2 millimeter. For these pieces, reheating the fibers for one hour or less at 800° C. is sufficient to eliminate most of the attenuation caused by the coloring of the reduced titania $Ti^{+3}$. The cause of this is the following reaction:

$$2Ti^{+3} + 2O^{-2} + 2OH^- = 2Ti^{+4} + 4O^{-2} + H_2\uparrow$$

or in more general terms:

$$2R^{+3} + 2O^{-2} + 2OH^- \rightarrow 2R^{+4} + 4O^{-2} + H_2\uparrow$$

During the heat treatment the hydrogen gas diffuses out of the glass so that the process is no longer reversible. That is, the glass is permanently transparent.

We have found that the foregoing reaction will proceed faster and to a greater degree if the hydroxyl ion concentration is very much greater than the concentration of reduced ions. We have found that a good ratio of hydroxyl ion concentration to reduced ion concentration is approximately 10:1. A greater hydroxyl ion concentration will be little more effective in speeding up oxidation. The reaction will also proceed with deutroxyl ions which may be present in the glass if the glass is made in the presence of a deuterium atmosphere.

There are several combinations of heat treating times and temperatures which can be used to reduce the attenuation significantly. Heat treatment in the temperature range 700° C.–1,000° C. is desirable. The times depend upon temperature and sample size. For example, at 800° C., the time is given approximately by $$t = x^2/3.2 \times 10^{-6}$$

where $x$ is the smallest sample dimension or radius in centimeters and $t$ is in seconds.

Figure 2:
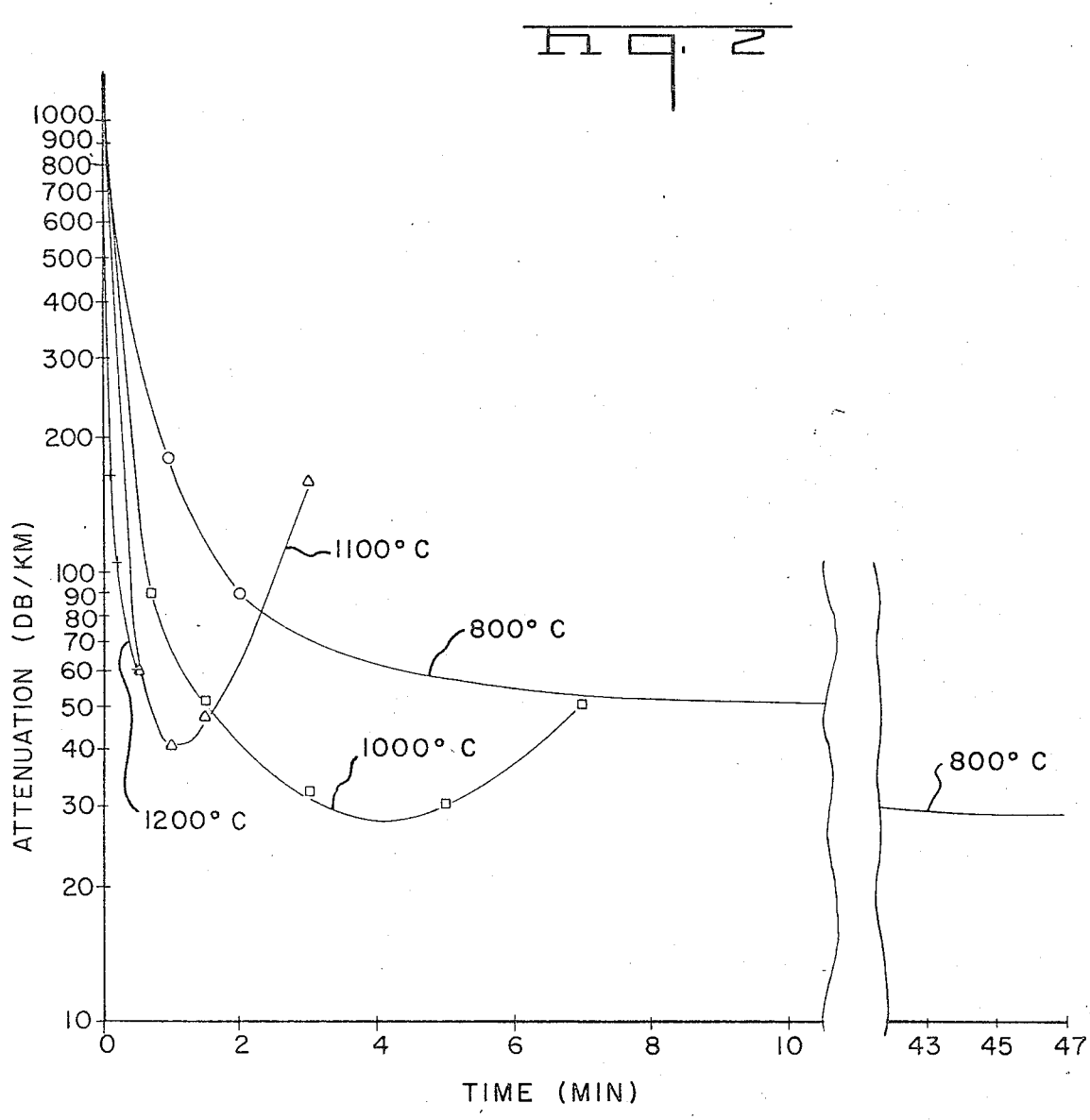
FIG. 2 shows curves of attenuation as a function of heat treating time for various temperatures of heat treating.

The relationship between attenuation, heat treatment temperature and heat treatment time for a waveguide consisting of a core of about 3.7% $TiO_2$-$SiO_2$ glass, 160 microns in diameter with a cladding of $SiO_2$ 20 microns thick is shown in FIG. 2. Note that there is a minimum value in the attenuation curve. This minimum value increases with increasing temperature and the time to attain the minimum value decreases with increasing temperature. For the particular waveguide under consideration the lowest attenuation attained was 30 db per kilometer. This value was achieved by heating at 800° C. for 45 minutes or 1,000° C. for 3 minutes.

Figure 3:
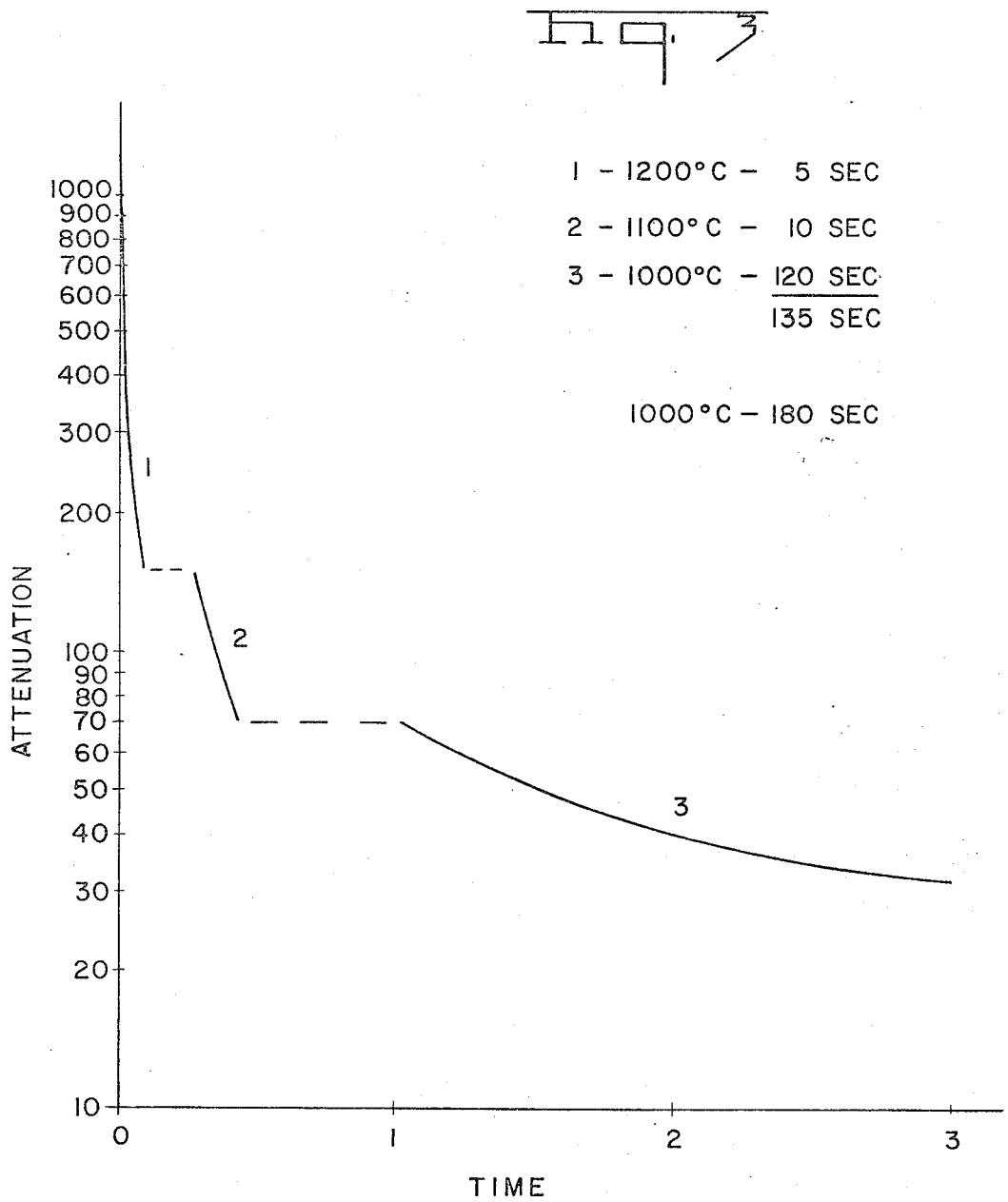
FIG. 3 shows more attenuation curves.

It is possible to shorten the time of heat treating by using combinations of temperatures and times. FIG. 3 depicts a technique for reducing the total time required to obtain an attenuation of 30 db in the waveguide previously considered. The portion of the curve marked 1 depicts heat treating at 1,200° C. for 5 seconds to reduce the attenuation to 115 db per kilometer. The portion of the curve marked 2 depicts heat treating at 1,100° C. for 10 seconds to reduce the attenuation to 60 db per kilometer. Finally, the portion of the curve marked 3 depicts heat treating at 1000° C. for 2 minutes to reach an attenuation of approximately 30 db per kilometer. This is a total of 2 minutes and 15 seconds as contrasted to a time of 3 minutes at 1,000° C. to reach approximately the same attenuation.

Other combinations of time and temperature may shorten the time required to reach the minimum attenuation for a particular waveguide.

Figure 4:
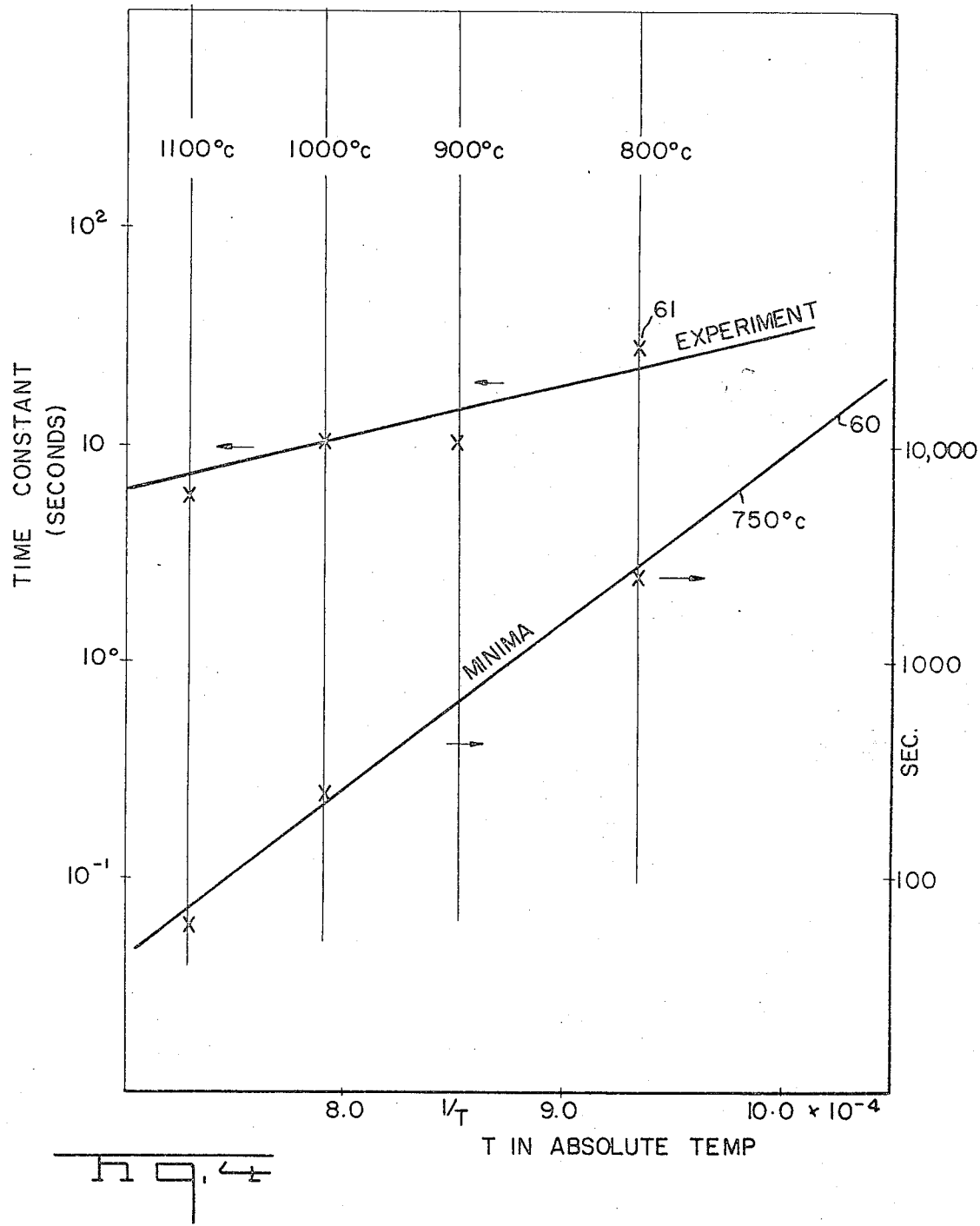
FIG. 4 shows a graph of both the heat treatment time and the experimental time constant to produce minimum attenuation as a function of the inverse of the absolute temperature.

FIG. 4 shows the times as a function of the inverse of the temperature which produces the minimum in the attenuation curves. Note that on one piece of multi mode waveguide the point marked 60 shows that at 700 degrees a time of approximately 15,000 seconds (about 4 hours) produces the minimum in the attenuation curve. On FIG. 4 the point marked 61 on another piece agrees with the time given by the formula $$t = x^2/3.2 \times 10^{-6}$$

While the $SiO_2$ glasses previously described can be particularly well treated in accordance with this invention, it will be appreciated that the heat treatment process is applicable to other oxide glasses.

Many techniques are suitable for heat treating the waveguide in accordance with this invention. The simplest technique is to place the coiled waveguide in an oven with an air atmosphere for the time and at the temperature desired. An alternative to this is to use the annealing furnace shown in FIG. 5. This furnace, and its use for annealing waveguides, is the subject of copending application Ser. No. 215,320, De Luca and Jenkins. This furnace system includes a freewheeling, lightweight supply drum 26 having an adjustable drag. An annealing furnace 28 has an input muffle 30 at one end and an output muffle 32 at the other end. A takeup drum 34 is driven by a motor 36.

The input muffle 30 is closed by an input cap 38 having an opening 40. The output muffle 32 is closed by an output cap 42 having an opening 44. The small diameter fiber waveguide is initially wound on the freewheeling supply drum 26. As the fiber is unreeled, it is maintained under sufficient tension so that the fiber 46 assumes a slightly slack configuration within the furnace 28. Oxygen gas enters only through gas inlet 48 and is exhausted through gas outlet 50. The temperature of the oven can be closely controlled. Also, by carefully regulating the speed of the motor, the time that the waveguide is in the oven can be closely controlled.

While a particular embodiment of the invention has been shown and described, it will, of course, be understood that various modifications may be without departing from the principles of the invention. The appended claims are, therefore, intended to cover any such modification within the true spirit and scope of the invention.

What is claimed is:

1. The method of producing low light attenuation optical waveguides comprising:
   forming a fiber with a core and cladding of oxide glass containing hydroxyl ions,
   heating the fiber to a temperature which is sufficient for drawing said fiber and which temperature also chemically reduces the oxides of the glass,
   drawing said fiber to form a fiber of solid cross-sectional area and which has light attenuation caused by said hydroxyl ions and the reduced oxides of the glass, and
   thereafter heat treating said fiber of solid cross-sectional area at a temperature below the melting temperature of said fiber wherein said hydroxyl ions serve as an oxidizing agent to oxidize the reduced oxides to decrease the light attenuation of said fiber.

2. The method recited in claim 1 wherein said oxide glass includes a doped $SiO_2$ core and a cladding of pure $SiO_2$ or doped $SiO_2$.

3. The method recited in claim 1 wherein the heat treating temperature is in the range of 700° C.–1200° C.

4. The method recited in claim 3 wherein the time of heat treating is less than six hours.

5. The method recited in claim 1 wherein said fiber is made of $SiO_2$ doped with the oxide of a multivalent element R and wherein the reaction during heat treating is:

$$2R^3 + 2O^{-2} + 2OH^- \rightarrow 2R^{+4} + 4O^{-2} + H_2\uparrow$$

and wherein hydrogen diffuses out of said sample so that the reaction is not reversible.

6. The most recited in claim 5 wherein said oxide of a multivalent element is titanium dioxide.

7. The method recited in claim 2 wherein said fiber is formed with a concentration of hydroxyl ions which is approximately ten times the concentration of the reduced oxides.

8. The method recited in claim 1 wherein the time of said heat treating produces a minimum attenuation for the temperature at which said heat treating is performed.

9. The method recited in claim 8 wherein said heat treating step includes heating said fiber at a combination of times and temperatures to shorten the time required to reach the minimum attenuation.

References Cited

UNITED STATES PATENTS

| | | | |
|---|---|---|---|
| 3,060,789 | 10/1962 | Hicks, Jr. | 65—DIG. 7 |
| 3,700,423 | 10/1972 | Kaiyturski | 65—111 |
| 3,711,262 | 1/1973 | Keck et al. | 65—30 |
| 3,395,994 | 8/1968 | Cuff | 65—111 |
| 3,485,609 | 12/1969 | Peck | 65—111 |
| 3,531,271 | 9/1970 | Dumbauga, Jr. | 65—32 |

FRANK W. MIGA, Primary Examiner

U.S. Cl. X.R.

65—DIG. 7, 30, 32, 111, 134; 106—50, 52